United States Patent [19]

Liechti et al.

[11] 4,062,836
[45] Dec. 13, 1977

[54] DISPERSE PHENYLAZOPHENYLAZOBARBITURIC ACID DYESTUFFS

[75] Inventors: Hans Wilhelm Liechti, Oberwill; Dieter Reinker, Seltisberg, both of Switzerland

[73] Assignee: Ciba-Geigy Corporation, Ardsley, N.Y.

[21] Appl. No.: 669,771

[22] Filed: Mar. 24, 1976

Related U.S. Application Data

[63] Continuation of Ser. No. 546,864, Feb. 3, 1975, abandoned, which is a continuation of Ser. No. 225,276, Feb. 10, 1972, abandoned.

[51] Int. Cl.$^2$ .................. C09B 31/28; D06P 1/18; D06P 3/26; D06P 3/54
[52] U.S. Cl. .................. 260/154; 260/205; 260/206; 260/257; 260/575; 260/578
[58] Field of Search .................................. 260/154

[56] References Cited

U.S. PATENT DOCUMENTS

| | | | |
|---|---|---|---|
| 2,103,269 | 12/1937 | McNally et al. | 260/154 X |
| 2,130,358 | 9/1938 | McNally et al. | 260/154 X |
| 2,140,536 | 12/1938 | McNally et al. | 260/154 X |
| 2,140,537 | 12/1938 | McNally et al. | 260/154 X |
| 2,140,538 | 12/1938 | McNally et al. | 260/154 X |
| 2,140,539 | 12/1938 | McNally et al. | 260/154 X |
| 2,140,987 | 12/1938 | Dickey | 260/154 X |
| 2,171,159 | 8/1939 | McNally et al. | 260/154 X |
| 2,216,446 | 10/1940 | McNally et al. | 260/154 X |
| 2,578,290 | 12/1951 | Dickey et al. | 260/154 |
| 3,234,206 | 2/1966 | Liechti | 260/155 |
| 3,341,512 | 9/1967 | Wegmuller et al. | 260/154 |
| 3,377,129 | 4/1968 | Wegmuller et al. | 260/154 X |

FOREIGN PATENT DOCUMENTS

| | | | |
|---|---|---|---|
| 513,414 | 10/1939 | United Kingdom | 260/154 |

*Primary Examiner*—Floyd D. Higel
*Attorney, Agent, or Firm*—Michael W. Glynn; Edward McC. Roberts

[57] ABSTRACT

The instant invention relates to diazo dyestuffs of the formula

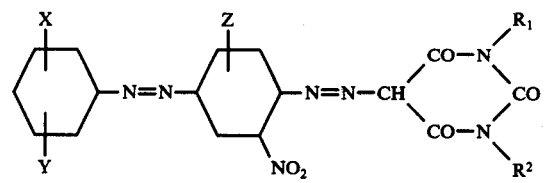

where
X and Y are hydrogen, chloro, $C_1$-$C_4$ alkyl or $C_1$-$C_4$ alkoxy,
Z is hydrogen, $C_1$-$C_4$ alkyl or $C_1$-$C_4$ alkoxy, and
$R_1$ and $R_2$ each are hydrogen, $C_1$-$C_4$ alkyl or $C_1$-$C_4$ alkyl substituted by $C_1$-$C_4$ alkoxy, hydroxy or cyano.

These dyestuffs dye polyester to yield powerful dyeings in yellow shades, which are distinguished by outstanding fastness to light and sublimation.

1 Claim, No Drawings

DISPERSE PHENYLAZOPHENYLAZOBARBITURIC ACID DYESTUFFS

This is a continuation of application Ser. No. 546,864, filed Feb. 3, 1975 and now abandoned, which was a continuation of Ser. No. 225,276, filed Feb. 10, 1972 and now abandoned.

The present invention relates to new disazo dyestuffs which are free from acid water-solublising groups and have the formula

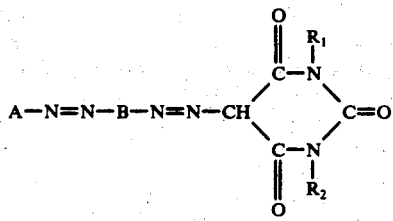

(1), wherein A and B are optionally substituted aromatic radicals, of which B preferably carries a nitro group in meta-position to the azo bridge linking it to A, and $R_1$ and $R_2$ are hydrogen atoms or optionally substituted hydrocarbon radicals.

The new compounds are obtained by coupling a diazotised aminoazo dyestuff which is free from acid water-solubilising groups and has the formula

wherein A and B represents aromatic radicals, of which B carries a nitro group in meta-position to the azo group, with a coupling component of the formula

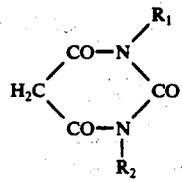

(2a),

Suitable diazo components are in particular dizaotised aminoazo compounds of the formula

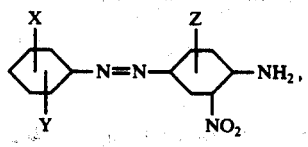

(3)

wherein X and Y represent hydrogen, halogen, lower alkyl or alkoxy groups, and Z represents hydrogen or lower alkyl or alkoxy groups.

The aminoazo dyestuffs of the formula (3) can be manufactured in a manner known per se, for example by condensing an amine of the formula

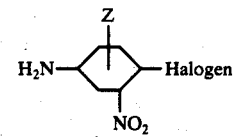

wherein Z has the meaning given hereinabove, with a nitroso compound of the formula

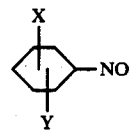

wherein X and Y have the meanings given hereinabove, and, in the resulting condensation product, replacing the halogen atom which is in ortho-position to the nitro group, by reacting acid condensation product with ammonia. One embodiment of the invention relates to dyes of the formula

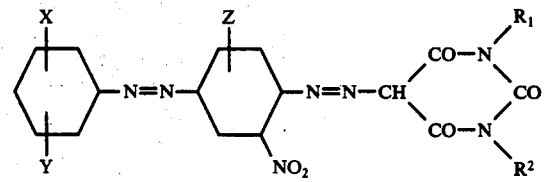

where
X and Y are hydrogen, chloro, $C_1$-$C_4$ alkyl or $C_1$-$C_4$ alkoxy,
Z is hydrogen, $C_1$-$C_4$ alkyl or $C_1$-$C_4$ alkoxy, and
$R_1$ and $R_2$ each are hydrogen, $C_1$-$C_4$ alkyl or $C_1$-$C_4$ alkyl substituted by $C_1$-$C_4$ alkoxy, hydroxy or cyano. In a preferred embodiment thereof $R_1$ and $R_2$ are hydrogen.

As particularly suitable diazo components, special mention may be made of the following aminoazo dyestuffs:

3-nitro-4-amino-1,1'-azobenzene,
3-nitro-4-amino-4'-methyl-1,1'-azobenzene,
3-nitro-4-amino-4'-chloro-1,1'-azobenzene,
3-nitro-4-amino-4'-methoxy-1,1'-azobenzene,
3-nitro-4-amino-2'-methyl-1,1'-azobenzene,
3-nitro-4-amino-2'-methoxy-1,1'-azobenzene, 3-nitro-4-amino-6-methoxy-1,1'-azobenzene,
3-nitro-4-amino-6-methyl-1,1'-azobenzene, For the reaction according to the invention, the following compounds are suitable of coupling components of the formula (2a):

1-phenyl-3-methylbarbituric acid,
1-phenyl-3-(γ-methoxypropy)-barbituric acid,
1,3-dibutylbarbituric acid,
1-phenyl-3-butylbarbituric acid,
1-phenyl-3-(β-chlorocthyl)-barbituric acid,
1-phenyl-3-(β-bromoethyl)-barbituric acid,
1-phenyl-3-(βcyanoethyl)-barbituric acid,
1-(3'-chlorophenyl)-3-methylbarbituric acid,
1-(2'-methylphenyl)-3-methylbarbituric acid,
1-(4'-ethoxyphenyl)-3-methylbarbituric acid,
1-(2',4'-dimethylphenyl)-3-propylbarbituric acid, 1(4'-ethylphenyl)-3-methylbarbituric acid,
1-(3',4'-dichlorophenyl)-3-ethylbarbituric acid,
1-(2'-methoxy-5'-methylphenyl)-3-methylbarbituric acid,
1-(2'-bromophenyl)-3-isopropylbarbituric acid,
1-(3'-methylphenyl)-3-propylbarbituric acid,
1-(2'-methoxyphenyl)-3-propylbarbituric acid,
1-(2'-methyl-5'-chlorophenyl)-3-methylbarbituric acid.

Particularly preferred are carbituric acid derivatives which are substituted with lower alkyl radicals containing up to 4 carbon atoms, and barbituric acid itself. Accordingly, the use of the following coupling components is preferred:

1-methylbarbituric acid,
1-ethylcarbituric acid,
1-propylcarbituric acid,
1-isopropylbarbituric acid,
1,3-dimethylbarbituric acid.

The diazotisation of the compounds of the formulae (2) and (3) may be carried out according to the conventional methods which are known per se, for example using hydrochloric acid and sodium nitrite. According to the process of the invention, the diazotised monoazo compounds which may be obtained in this manner are coupled with the cited coupling components in alkaline medium.

The new dyestuffs yield valuable dyestuff preparations, especially after they have been converted into a finely divided form, for example by grinding, making them into a paste, precipitation with textile auxiliaries, chiefly with surfactants.

As examples of surfactants of the non-ionic group which may be used with advantage there may be cited: adducts of 8 mols of ethylene oxide with 1 mol of p-tert. octylphenol, of 15 or 6 mols of ethylene oxide with castor oil, of 20 mols of ethylene oxide with the alcohol $C_{16}H_{33}OH$, ethylene oxide adducts with di-α-phenylethyl -phenols, polyethylene oxide-tert. dodecylthioether, polyamine polyglycol ether or adducts of 15 or 30 mols of ethylene oxide with 1 mol of the amine $C_{12}H_{25}NH_2$ or $C_{18}H_{37}NH_2$.

As anionic surfactants or dispersants there may be cited: sulphuric acid esters of alcohols of the fatty series containing 8 to 20 carbon atoms, of the ethylene oxide adducts of the corresponding fatty acid amides, or of alkylated phenols containing 8 to 12 carbon atoms in the alkyl radical; sulphonic acid esters with alkyl radicals containing 8 to 20 carbon atoms, sulphation products of unsaturated fats and oils; phosphoric acid esters with alkyl radicals containing 8 to 20 carbon atoms; and finally, fatty acid soaps.

Suitable cationic surfactants are quaternary ammonium compounds which contain alkyl or aralkyl radicals having 8 to 20 carbon atoms.

The dyestuffs according to the invention are particularly suitable for dyeing synthetic fibres, for example acrylonitrile fibres of polyacrylonitrile and copolymers of acrylonitrile and other vinyl compounds, such as acrylic estes, acrylic amides, vinyl pyridine, vinyl chloride or vinylidene chloride, copolymers of dicyanoethylene and vinyl acetate, also of acrylonitrile block copolymers, fibres of polyurethanes, polyolefines, cellulose triacetate and 2½ acetate, polyamides, for example nylon 6, nylon 66 or nylon 12, and particularly fibres of aromatic polyesters, such as those of terephthalic acid and ethylene glycol or 1,4-dimethylolcyclohexane, and co-polymers of terephtalic and isoterephthalic acid and ethylene glycol.

Using the conventional dyeing methods, for example from an aqueous dyebath containing a fine dispersion of the dyestuff and, advantageously, a surfactant, and at temperatures close to 100° C optionally accompained by the application of overpressure, pure, powerful dyeings in yellow shades, which are distinguished by outstanding fastness to light and sublimation, are obtained on polyester fibres.

The dyestuffs according to the invention are also suitable for dyeing by the so-called thermosol process, according to which the fabric to be dyed is impregnated — preferably at a maximum temperature of 60° — with an aqueous dispersion of the dyestuff which contains advantageously 1 to 50% of urea and a thickener, in particular sodium alginate, and squeezed out in the conventional manner. The imgregnated fabric is appropriately squeezed out in such a manner that it retains 50% to 100% of its initial weight of dye liquor. The dyestuff is fixed by heating the thus impregnated fabric to temperatures of over 100° C, for example between 180° C and 210° C, advantageously after previously drying it, for example in a current of warm air.

The thermosol process just mentioned is of particular interest for dyeing blended fabrics of polyester and cellulose fibres, especially cotton. In this case, the padding liquor contains in addition to the dyestuff according to the invention suitable dyestuffs for dyeing cotton, for example vat dyestuffs. When using these latter, it is necessary to treat the padded fabric after the heat treatment with an aqueous alkaline solution of a reducing agent conventionally used in vat dyeing.

The following Examples illustrates the invention, the parts and percentages being by weight unless otherwise stated.

EXAMPLE 1

27 Parts of 3-nitro-4-amino-3',4'-dimethyl-1,1'-azobenzene are diazotised. The diazo compounds are combined at 5° C to 10° C with a solution of 15.6 parts of 1,3-dimethylbarbituric acid in 100 parts of water, 5 parts of 30% sodium hydroxide solution and 20 parts of sodium carbonte, when an immediate coupling to give the diazo dyestuff takes place. The completely precipitated dyestuff is filtered off, washed with water until it shows neutral reaction, and dried.

The new water-insoluble dyestuff of the formula

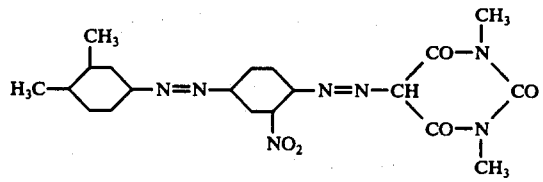

is a yellow powder which, in finely divided form, dyes the polyester fibres in golden yellow shades. These dyeings have very good fastness to light and sublimation. The wool which is optionally admixed with the polyester fibres is only slightly dyed.

Yellow dyeings which similarly have good fastness to light and sublimation are obtained on polyester fibres with the dyestuffs of the following Table which correspond to the formula

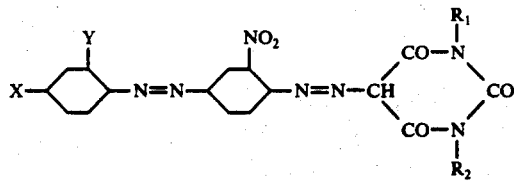

and are manufactured in analogous manner as described hereinabove.

| X | Y | R$_1$ | R$_2$ |
|---|---|---|---|
| CH$_3$ | H | H | H |
| C$_2$H$_5$ | H | H | H |
| OCH$_3$ | H | H | H |
| OC$_2$H$_5$ | H | H | H |
| Cl | H | H | H |
| H | CH$_3$ | H | H |
| H | OCH$_3$ | H | H |
| H | Cl | H | H |
| Cl | Cl | H | H |
| CH$_3$ | CH$_3$ | H | H |
| OCH$_3$ | CH$_3$ | H | H |
| Cl | CH$_3$ | H | H |
| H | H | CH$_3$ | H |
| H | H | C$_2$H$_5$ | H |
| H | H | CH$_2$.CH$_2$CH$_3$ | H |
| H | H | CH(CH$_3$)$_2$ | H |
| H | H | CH$_3$ | CH$_3$ |
| CH$_3$ | H | CH$_3$ | H |
| OCH$_3$ | H | CH$_3$ | H |
| Cl | H | CH$_3$ | H |
| CH$_3$ | CH$_3$ | CH$_3$ | H |
| H | CH$_3$ | CH$_3$ | H |
| H | OCH$_3$ | CH$_3$ | H |
| H | Cl | CH$_3$ | H |
| CH$_3$ | CH$_3$ | CH$_3$ | H |
| OCH$_3$ | CH$_3$ | CH$_3$ | H |
| Cl | CH$_3$ | CH$_3$ | H |
| Cl | Cl | CH$_3$ | H |
| H | H | H | H |
| CH$_3$ | H | CH$_3$ | CH$_3$ |
| OCH$_3$ | H | CH$_3$ | CH$_3$ |
| Cl | H | CH$_3$ | CH$_3$ |
| H | H | C$_2$H$_5$ | H |
| CH$_3$ | H | C$_2$H$_5$ | H |
| OCH$_3$ | H | C$_2$H$_5$ | H |
| Cl | H | C$_2$H$_5$ | H |
| H | H | C$_2$H$_5$ | C$_2$H$_5$ |
| H | H | CH$_2$.CH$_2$.CH$_3$ | H |
| CH$_3$ | H | CH$_2$.CH$_2$.CH$_3$ | H |
| OCH$_3$ | H | CH$_2$.CH$_2$.CH$_3$ | H |
| Cl | H | CH$_2$.CH$_2$.CH$_3$ | H |
| H | H | CH(CH$_3$)$_2$ | H |
| CH$_3$ | H | " | H |
| OCH$_3$ | H | " | H |

DYEING INSTRUCTION 1

1 Part of the dyestuff according to Example 1, paragraph 1, is ground wet with 2 parts of a 50% aqueous solution of sulphite cellulose lye and dried.

This dyestuff preparation is stirred with 40 parts of a 10% aqueous solution of a condensation product of octadecylalcohol with 20 mols of ethylene oxide and 4 parts of a 40% acetic acid solution are added. By dilution with water, a dyebath of 4000 parts is prepared therefrom.

At 50° C, 100 parts of a purified polyester fibre fabric is put into this bath, the temperature is raised within half an hour to 120°-130° C and dyeing carried out for 1 hour in a closed vessel at this temperature. The fabric is then thoroughly rinsed. A powerful, golden yellow dyeing having good fastness to light and sublimation is obtained.

DYEING INSTRUCTION 2

100 Parts of a purified polyester fibre material are put at 50° C into a dyebath containig 12 parts of diammonium phosphate with 40 parts of a 10% aqueous solution of a condensation product of octadecylalcohol with 20 mols of ethylene oxide in 4000 parts of water and fabric is treated for 15 minutes. The solution of 12 parts of o-phenylphenol in dilute sodium hydroxide solution is then added and treatment is carried out for a further 15 minutes at 50° C to 55° C.

A fine dispersion of 1 part of the dyestuff according to Example 1, paragraph 1, in 2 parts of a 50% aqueous solution of sulphite cellulose lye is then added and the temperature is raised within half an hour to boiling. Dyeing is subsequently carried out for 1½ to 2 hours at the boil.

The dyed fabric is then treated for 30 minutes at 60° C to 70° C in a bath which contains 2 parts of 30% sodium hydroxide solution and 10 parts of a 10% aqueous solution of a condensation product of octadecylalcohol with 20 mols of ethylene oxide in 100 parts of water, and subsequently rinsed. A powerful, golden yellow dyeing is obtained having good fastness to light and good fastness to sublimation.

DYEING INSTRUCTION 3

14 Parts of the dyestuff used in Example 1, paragraph 1, are finely ground in a ball mill with 126 parts of a neutral solution of 125 parts of dinapththylmethanedisulphonic acid in 1000 parts of water.

A padding liquor of the following composition is prepared:

| | |
|---|---|
| 200 parts of the above described dyestuff parts | |
| 300 parts of sodium alginate 1:100 | |
| 500 parts of water | |
| 1000 parts. | |

A polyester fabric is padded (12 runs) with the treatment bath described hereinabove so that its weight increases 50 to 60% and then dried at 60° C. The fabric is then subjected to a heat treatment for 15 to 120 seconds at a temperature of 200°-220° C. It is then soaped at the boil for 30 minutes with a solution of 5 g of soap in 1 litre of water and finished in the conventional manner (rinsing, drying). A golden yellow dyeing having excellent fastness properties is obtained.

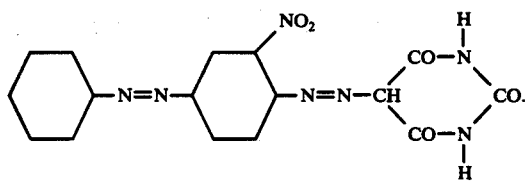

We claim:

1. A disazo dyestuff of the formula